United States Patent [19]

Royse, Jr.

[11] 4,070,037
[45] Jan. 24, 1978

[54] SUSPENSION FOR VEHICLES

[76] Inventor: Arnold Royse, Jr., Rte. 1, Box 158, Flemingsburg, Ky. 41041

[21] Appl. No.: 715,950

[22] Filed: Aug. 19, 1976

[51] Int. Cl.² .............................................. B62M 1/00
[52] U.S. Cl. ...................................... 280/719; 267/40
[58] Field of Search ............... 280/719, 720, 721, 724; 267/40, 57

[56]  References Cited
U.S. PATENT DOCUMENTS 3,486,762  12/1969  Turnbull ............................. 280/104
4,014,561  3/1977  Tomiya et al. ...................... 280/104

Primary Examiner—Richard A. Bertsch
Attorney, Agent, or Firm—Dowell & Dowell

[57] ABSTRACT

A suspension for a vehicle frame wherein there are two elongated mutually crossing cantilever arms on each side of the frame, two of the arms being pivoted to the frame near its front and carrying drive wheels at their rear ends, and two other arms being pivoted to the frame near its rear and carrying steered wheels at their front ends, and the arms being spring urged with respect to the frame at points which are located near the opposite end of the frame from the end where the wheels they carry are located, and the suspension having appropriate guides, stop members, and stabilizers for controlling the motions of the arms.

10 Claims, 7 Drawing Figures

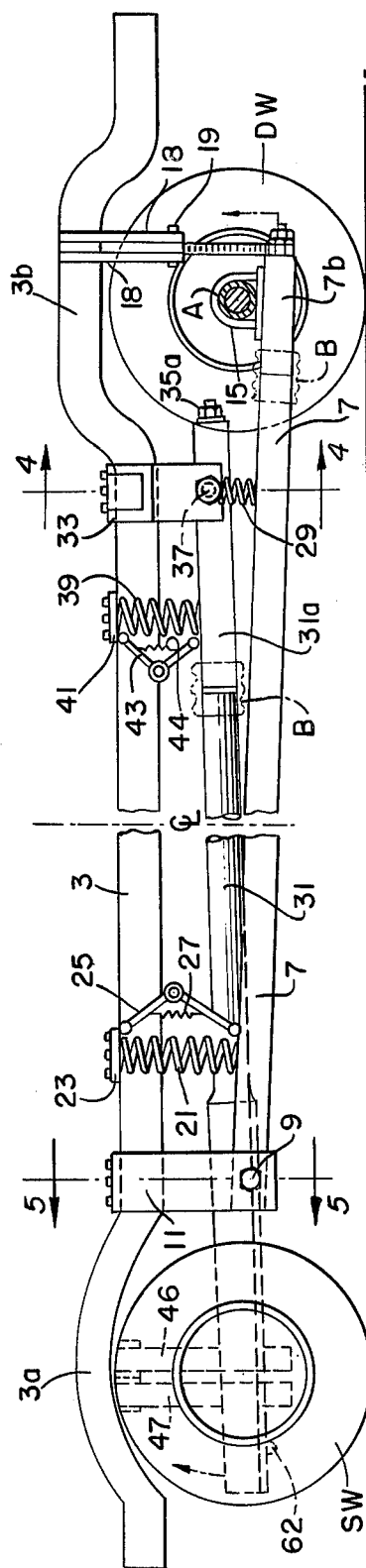
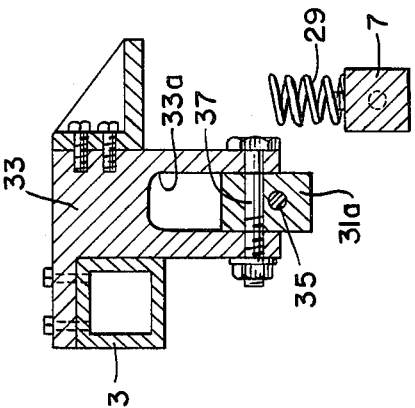
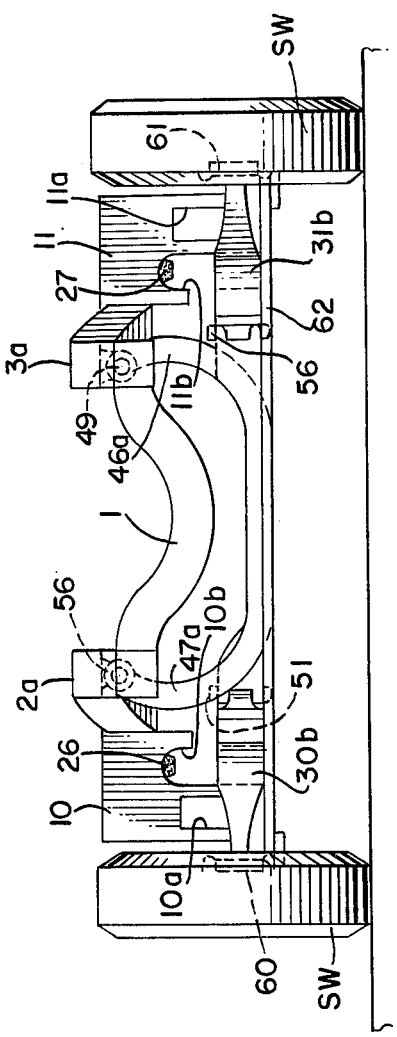
FIG. 2.
FIG. 4.
FIG. 3.

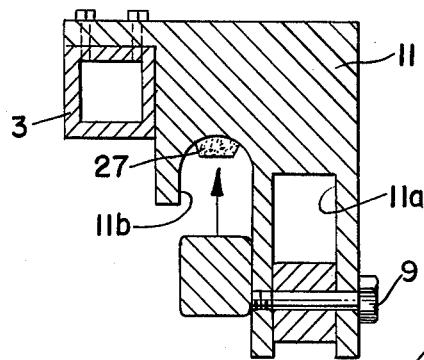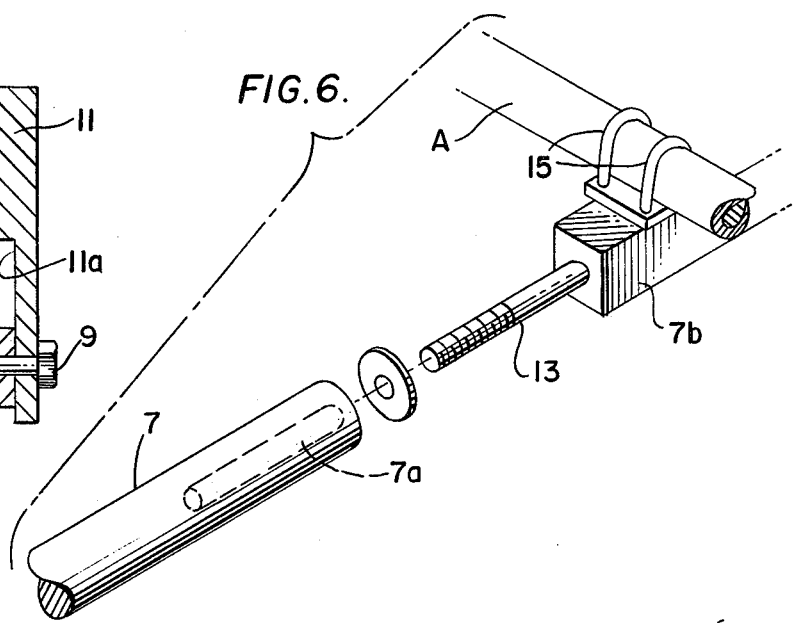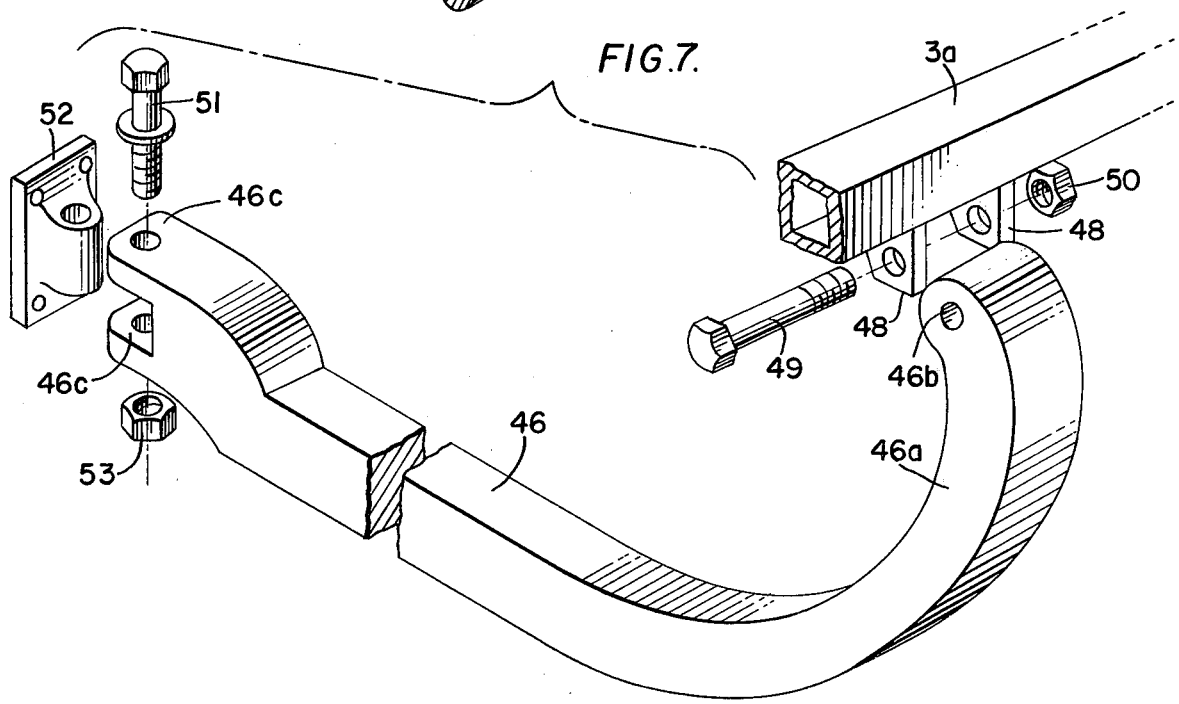

SUSPENSION FOR VEHICLES

FIELD OF INVENTION

This invention relates to a suspension for road vehicles having drive wheels and having steered wheels carried by a vehicle frame, and more particularly relates to a suspension in which the wheels are supported by pivoted cantilever arms spring-urged toward the surface of the ground.

BACKGROUND AND PRIOR ART

A number of spring suspensions have been proposed in which vehicle wheels are supported at the free ends of arms pivotally connected to the vehicle frame as shown for instance, in U.S. Pat. Nos. 2,888,271 to Butterfield and 2,956,814 to Jackson. Most of these patents show arms which are short as compared with the length of the vehicle frame, but U.S. Pat. No. 1,695,379 to Keck shows long cantilever arms, roughly as long as the vehicle frame. Another patent showing leaf-spring cantilever arms which are long is U.S. Pat. No. 3,107,104 to Angell.

THE INVENTION

The invention provides a suspension for a vehicle frame, which frame may comprise either a chassis or a unit-welded frame. The suspension has elongated substantially parallel cantilever arms each supporting an end of an axle at its free end and each arm being pivotally connected to the frame at its other end. The rear-wheel suspension arms are pivoted and sprung near the front of the frame, and they cross the front-wheel suspension arms which are pivoted and sprung near the rear of the frame. The hanger brackets which suspend and pivot one cantilever arm are shaped to pass and guide the adjacent cantilever arm extending in the opposite direction. The illustrative embodiment shows an axle for the drive wheels which is one-piece and shackled to the rearwardly extending pair of cantilever arms, but the axle means for the steered wheels comprises dual transverse axles disposed parallel to each other, each with one end coupled to a cantilever arm and the other end pivoted to the frame. The suspension is provided with appropriate stabilizer means and with appropriate stops to limit the vertical travel of the cantilever arms about their pivots.

OBJECTS AND ADVANTAGES

It is a major object of this invention to provide a vehicle suspension yielding a smoother and more comfortable ride of the vehicle by virtue of an improved system of long cantilever arms which are pivotally connected to the vehicle at points remote from the wheels which they support.

It is another important object of the invention to provide a vehicle suspension in which the torque of the drive wheels mounted by the aforementioned long cantilever arms is effectively counteracted, and the torque applied by all four wheels to the axles during braking is counteracted. The length of the cantilever arms is great enough to provide very effective counteracting of such torques.

A further object of the invention is to provide a vehicle having greater traction, especially on rough terrain, due to the fact that the wheels, in moving up and down, follow almost vertical paths because the pivot points of the cantilever arms with respect to the wheel locations are far displaced therefrom.

It is a further object of the invention to provide a suspension in which the spring rate for the main suspension springs remains more nearly constant during normal up and down motions of the cantilever arms because the amplitude of motion during compression and expansion of the main suspension springs is relatively small even for relatively large amplitudes of motion of the wheels mounted at the free ends of the cantilever arms. In other words, the location of these springs near the pivots of the lengthy cantilever arms permits large amplitudes of movement of the wheels while requiring only small amplitudes of movement in compression and expansion of the main suspension springs.

Still another object of the invention is to provide a novel vehicle suspension in which the cantilever arms each contains a swivel joint permitting turning of the arm about its own axis at the end of the arm which supports the wheel. This provides for more nearly independent motion of the rear wheels with respect to each other despite the use of a continuous axle housing.

Furthermore, the use of the swivel joints within each of the cantilever arms makes torsional bending of the arms about their own axis unnecessary, whereby the arms can be made of a lightweight fabricated structure to achieve desirable reduction in weight and therefore a decrease in inertia of the arms. One suggested structure has been an external tubing with a triangular internal member extending down its center and providing additional stiffening.

Another object of the invention is to use a system of four main hanger brackets, each bracket performing the dual function of hingedly supporting a pivot for a cantilever arm extending in one direction, while at the same time acting as a stop to limit the vertical movement of the cantilever arm which extends in the opposite direction from a hanger bracket located near the other end of the vehicle. The forward hanger brackets are so arranged with respect to the front-suspension cantilever arms as to guide the arms against lateral motion while also serving as stops for the arms in the upward direction.

Yet a further object of the invention is to provide a system in which the main suspension springs are mounted to other spring-support brackets located adjacent to the main hanger brackets. The springs can be coil springs as shown in the illustrative embodiment, or they can be rubber air actuated springs. Rubber pneumatic load-levellers can be used either in place of coil springs or to supplement them.

It is still a further object of the invention to provide a vehicle suspension using king-pin steering joints for the front wheels at the free ends of the forward suspension arms, and to use crossed dual axles mounted to the insides of the front end cantilever arms, the dual axles respectively being pivotally mounted on the vehicle frames on the opposite sides thereof from the cantilever arms to which they are attached. The cantilever arms are located generally below the center of gravity of the vehicle.

Other objects and advantages of the invention will become apparent during the following discussion of the drawings, wherein:

THE DRAWINGS

FIG. 2 is a view of the suspension taken along line 2—2 of FIG. 1;

FIG. 3 is a front view of the suspension;

FIG. 4 is a partial cross-sectional view taken along line 4—4 of FIG. 2;

FIG. 5 is a partial cross-sectional view taken along line 5—5 of FIG. 2;

FIG. 6 is an exploded detail perspective view of a portion of the suspension; and FIG. 7 is an exploded detail perspective view showing the mounting of a front axle member according to the invention.

Figure 1:
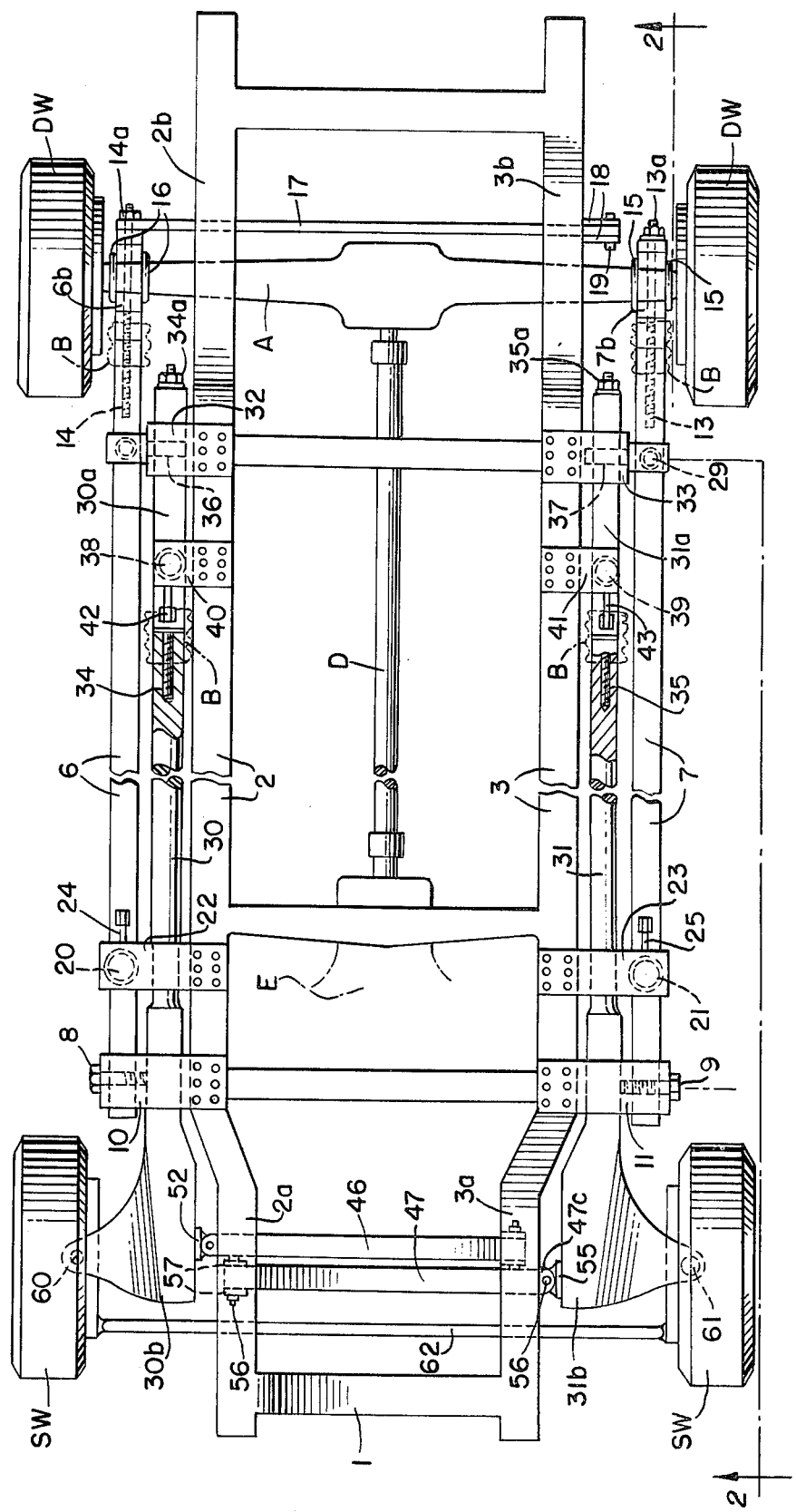
FIG. 1 is a plan view of a suspension according to the present invention, some parts of the suspension being shown in cross-section.

Referring now to the drawings, the vehicle suspension which is shown for illustrative purposes includes a frame 1 having side members 2 and 3. The side members are raised at 2a and 3a to clear the dual front axles, as viewed in FIG. 2, and are also raised as shown at 2b and 3b to clear the rear axle, which axles pass beneath these raised portions in the usual manner. The frame members 1, 2 and 3 may comprise either a chassis which is separate from the vehicle body, or alternatively, may comprise portions of a welded uni-body construction.

The vehicle has an engine E, a drive line D, and a rear axle A of a type common in the prior art. The rear axle is supported by rear suspension means comprising cantilever arms 6 and 7 which are supported by transverse pivot pins 8 and 9 carried by rear-suspension hanger brackets 10 and 11 of a construction which is best seen in FIG. 5. Each of the hanger brackets 10 and 11 has a downwardly facing recess such as the recesses 10a and 11a, FIGS. 3 and 5, into which the arms 6 and 7 are pivoted by the bolts 8 and 9. The rear ends of the arms 6 and 7 are provided with a threaded bore such as the bore 7a which receives the threaded end of a swivel pin 13 which passes through another separate portion 7b of the arm 7 and terminates in a washer and nut arrangement 13a, see FIG. 6. The portion 7b of the arm is filled with grease, packed about the swivel pin 13, and this portion 7b also supports the shackles 15 which clamp the rear axle A on the portion 7b. Thus, the axle A and the portion of the arm 7b are free to rotate about the axis of the swivel pin 13 while the main portion 7 of the arm is free to pivot up and down about the bolt 9.

Likewise, on the other side of the vehicle there is a corresponding portion 6b of the arm 6, shackles 16 supporting the axle A in the portion 6b of the arm, a swivel pin 14, and a nut 14a securing it in place. The nut 14a also secures the far end of a stabilizer bar 17, the near end of which as viewed in FIGS. 1 and 2 is mounted in two downwardly extending brackets 18 which are welded at their upper ends to the portion 3b of the vehicle frame. The bracket 18 is slanted toward the left-hand side of the vehicle so as to provide increased length of the stabilizer bar 17. The stabilizer bar is free to pivot about a pin 19 as the axle A moves up and down. Drive wheels DW are mounted on the axle A.

The rear-suspension cantilever arms 6 and 7 are urged downwardly by separate springs 20 and 21 which are supported at their upper ends, as shown in FIG. 2, by brackets 22 and 23, and which rest at their lower ends on the cantilever arms 6 and 7. The springs 20 and 21 are the main vehicle springs which support the rear suspension. A pair of articulated linkages 24 and 25 are pivoted at their respective ends to the side members of the chassis and to the rear suspension cantilever arms, and these linkages serve to limit the extent to which the rear axle and suspension can drop downwardly when the weight of the vehicle is raised from it. A spring such as the spring 27 shown in FIG. 2 urges each of the articulated linkages to break from fully extended position when the weight of the vehicle is placed again on the suspension. Conversely, when the rear suspension is driven upwardly, the cantilever arm 7 bottoms against a bumper 28 and spring 29, FIGS. 2 and 4, which parts are backed up from above by stationary abutments, best seen in FIG. 4 when considering the arm 7. The arm 6 on the other side of the vehicle is similarly limited in its upward travel. As can be seen in FIG. 2, the hanger brackets 10 and 11 and the spring brackets 22 and 23 for the rear suspension are both located well ahead of the longitudinal center line of the vehicle frame.

The front suspension of the vehicle is supported on two forwardly extending cantilever arms 30 and 31. These arms are pivotally supported in hanger brackets 32 and 33 at their rear ends the bracket 33 being best seen in FIG. 4. The cantilever arms 30 and 31 are connected by swivel pins 34 and 35 which are secured in the arms 30 and 31, respectively, and which then extend rearwardly through arm portions 30a and 31a, held in place by nuts 34a and 35a. The portions of the arms 30a and 31a are filled with grease to lubricate the swivel pins 34 and 35 so that the main portion of the arms 30 and 31 can pivot about the axis of these swivel pins. As can be seen in FIGS. 1, 2 and 4, the portions 30a and 31a of the front suspension cantilever arms are connected by transverse pivot pins 36 and 37 about which the forward end arms 30 and 31 are free to pivot in the vertical direction. These arms pass through recesses such as the recess 33a in the hanger bracket 33 about which the arm 31 pivots. The arms then extend forwardly from the brackets 32 and 33 and pass through inner recesses such as the recesses 10b and 11b in the hanger brackets 10 and 11, as best seen in FIGS. 3 and 5. At the top of each of the recesses 10b and 11b are located rubber bumpers 26 and 27 against which the cantilever arms 30 and 31 can bottom in the event that the steered front wheels SW encounter a sharp upward bump of large amplitude. The recesses in these brackets also tend to guide the front suspension arms 30 and 31 in their vertical movements. The suspension springs for the front suspension comprise the coil springs 38 and 39 are supported at their lower ends on the portions 30a and 31a of the cantilever arms, and at their upper ends are supported in brackets 40 and 41 provided for this purpose. Articulated linkages 42 and 43 are provided for the purpose of limiting the downward travel of the front suspension when the weight of the vehicle is raised therefrom, these articulated linkages also being provided with spring members such as the spring 44 to urge the articulated linkages to break in the correct direction when the weight of the vehicle is restored to the suspension. The front suspension hanger brackets 32 and 33 and spring brackets 40 and 41 are mounted to the vehicle frame well behind its longitudinal center.

The forward ends of the front suspension cantilever arms 30 and 31 are provided with wheel mounting head portions such as the portions 30b and 31b which serve to support the front axle mounts and the steering joints for the steered wheels SW. The front axles comprises dual axles 46 and 47. The axle 46 of the front suspension is best shown in FIG. 7, and is supported at its inner end in the side member 3a of the frame, the axle being curved upwardly as at 46a and terminating in a bearing hole 46b. Brackets 48 depend from the side frame member 3a and have aligned holes therethrough so that the bolt 49 and nut 50 can secure the inner end of the stub axle for vertical rocking. The other end of the axle has a clevis joint 46c thereat, the joint being attached to a plate 52 which is in turn bolted to the head portion 30b of the right-hand front suspension cantilever arm 30. A bolt 51 and nut 53 serve to transfix the clevis joint comprising the members 46c and 52.

Likewise, the front head portion 31b of the cantilever arm 31 is attached to the front axle 47 at a plate 55 which is attached to a clevis 47c of the axle 47 and held therein by a pin 56. The inner end of the axle 47 is connected to the frame member 2a by a pin 56 passing through two brackets 57, welded to the underside of the frame member portion 2a and similar in shape to the members 48 shown in FIG. 7. The curved contours of the axles 46 and 47 lower their central portions so that they can pass beneath an engine pan in a manner generally known in the prior art.

The steered front wheels SW are supported on kingpins 60 and 61 which pass through the head members 30b and 31b of the front suspension arms 30 and 31. Steering is accomplished in any suitable manner, for instance, by a gear box and pitman arm (not shown) connected to a front wheel tie rod 62 in any suitable manner.

At each of the four swivel joints as shown in FIG. 1 appropriate rubber boots B are added to prevent the entry of dust into the swivel joint or the leakage of lubricant therefrom. It is intended that shock absorbers will be incorporated as part of a practical suspension, and these shock absorbers will be placed at appropriate locations, generally extending from the frame of the vehicle to the points where the axles join the respective longitudinal cantilever arms.

The coil springs 20, 21, 38, and 39 can be replaced by air bag springs if desired, or they can be supplemented by pneumatic load levellers, these levellers being particularly useful in vehicles carrying heavy loads, for instance, such as pick-up trucks.

The present invention is not to be limited to the exact form shown in the drawings, for obviously changes may be made therein within the scope of the following claims.

I claim:

1. A suspension for a vehicle having elongated side frame members and having a pair of rear wheels and a pair of steered wheels, comprising:
    a pair of first hanger brackets mounted on the side frame members forward of the longitudinal center of the frame and extending transversely therefrom in opposite directions;
    rear suspension means including a pair of rearwardly extending cantilever arms offset from and extending substantially parallel to the side frame members and supported at their forward ends in transversely disposed horizontal pivots carried by said first hanger brackets;
    transverse axle means carrying said rear wheels and carried by said rearwardly extending cantilever arms near their rearward ends;
    rear suspension spring means coupled between each rearwardly extending cantilever arm and the frame, and operative to support the frame on the rear suspension.
    a pair of second hanger brackets mounted on the side frame members to the rear of the longitudinal center of the frame and extending transversely therefrom in opposite directions;
    forward suspension means including a pair of forwardly extending cantilever arms offset from and extending substantially parallel to the side frame members and to said rearwardly extending cantilever arms and supported at their rear ends in transversely disposed horizontal pivots carried by said second hanger brackets, each forwardly extending cantilever arm having at its front end a steering joint mounting a steered wheel outwardly of the frame;
    forward suspension spring means coupled between each forwardly extending cantilever arm and the frame, and operative to support the frame on the rear suspension; and
    a front axle coupled to the front of each front suspension cantilever arm and extending inwardly of the frame therefrom, each front axle extending across the center of the frame and being mounted in a horizontal longitudinal pivot in the side frame member opposite the arm to which it is attached.

2. The vehicle suspension as set forth in claim 1, wherein each cantilever arm passes reciprocably beneath a hanger bracket to which the adjacent cantilever arm extending in the opposite direction is pivoted, and stop means on each bracket to limit upward reciprocatory motion of the arm passing beneath it.

3. The vehicle suspension as set forth in claim 1, including rear axle stabilizer means coupled to the frame and to the rear suspension means, the stabilizer means being operative to oppose displacement of the rear axle means transversely of the frame.

4. The vehicle suspension as set forth in claim 1, wherein the rear suspension spring means is located forward of the longitudinal center of the frame, and the forward suspension spring means is located rearwardly of the longitudinal center of the frame.

5. The vehicle suspension as set forth in claim 1, wherein each of the cantilever arms has a swivel joint in it located between the location where an axle is attached near one end of the arm and the location near the other end of the arm where the arm is supported by a pivot and by a suspension spring means.

6. The vehicle suspension as set forth in claim 1, wherein said front axles cross the frame adjacent to each other, the front axles each having a curved downwardly extending portion adjacent its longitudinal pivot at a side frame member, and this portion joining a substantially horizontal portion extending to a cantilever arm.

7. The vehicle suspension as set forth in claim 6, wherein the horizontal portion of each front axle is coupled to the front end of a cantilever arm by a joint having a vertical swivel axis.

8. The vehicle suspension as set forth in claim 1, wherein each first hanger bracket includes two longitudinally-extending downwardly-opening recesses therethrough, a rearwardly-extending cantilever arm being pivoted in one recess, and a forwardly-extending cantilever arm passing through and being guided in the other recess.

9. The vehicle suspension as set forth in claim 1, including for each cantilever arm articulated linkage means coupled at one end to the vehicle frame and at its other end to the cantilever arm, the linkage means limiting the downward travel of the axle supporting end of the arm when the vehicle is raised.

10. The vehicle suspension as set forth in claim 1, wherein said forwardly extending arms each terminates at its front end in an enlarged head portion, the head portion having an inner surface facing toward said vehicle frame and attached to a front axle, and the head portion having an oppositely extending portion terminating in a king-pin steering joint adjacent to the associated steered wheel.

* * * * *